(12) United States Patent
Shimazu et al.

(10) Patent No.: US 7,641,413 B2
(45) Date of Patent: Jan. 5, 2010

(54) BALL JOINT

(75) Inventors: Kazuharu Shimazu, Shizuoka (JP); Takahiro Oda, Shizuoka (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 167 days.

(21) Appl. No.: 11/817,059

(22) PCT Filed: Feb. 23, 2006

(86) PCT No.: PCT/JP2006/303229

§ 371 (c)(1),
(2), (4) Date: Aug. 24, 2007

(87) PCT Pub. No.: WO2006/103849

PCT Pub. Date: Oct. 5, 2006

(65) Prior Publication Data

US 2009/0010706 A1  Jan. 8, 2009

(30) Foreign Application Priority Data

Mar. 29, 2005 (JP) .............................. 2005-095910

(51) Int. Cl.
*F16C 11/00* (2006.01)
(52) U.S. Cl. ........................ 403/135; 403/140; 403/141; 403/143

(58) Field of Classification Search ......... 403/124–126, 403/132, 133, 135, 140–143
See application file for complete search history.

(56) References Cited

FOREIGN PATENT DOCUMENTS

| JP | 62-270815 A | 11/1987 |
|---|---|---|
| JP | 04-316710 A | 11/1992 |
| JP | 7-2631 U | 1/1995 |
| JP | 7-30781 B2 | 4/1995 |
| JP | 2001-140852 A | 5/2001 |

*Primary Examiner*—Victor MacArthur
(74) *Attorney, Agent, or Firm*—Darby & Darby P.C.

(57) ABSTRACT

A ball joint is provided that when a load equal to or greater than a first predetermined value is applied in the axial direction of a ball stud, if a cushion seat is deformed by a predetermined amount, an opposing surface portion contacts a first load receiving portion of a ball seat, preventing the cushion seat from being deformed by a predetermined amount in the central axis direction. When a load equal to or greater than a second predetermined value greater than the first is applied in the axial direction of the ball stud, a second load receiving portion of the ball seat contacts a bottom surface portion of an inner chamber of a socket, whereby an axial load onto the cushion seat is reduced, and the ball seat prevents the cushion seat from being deformed by a predetermined amount or more in the axial direction.

2 Claims, 2 Drawing Sheets

(a)

(b)

BALL JOINT

CROSS REFERENCE TO RELATED APPLICATIONS

This is a U.S. national phase application under 35 U.S.C. §371 of International Patent Application No. PCT/JP2006/303229, filed Feb. 23, 2006 and claims the benefit of Japanese Application 2005-095910, filed Mar. 29, 2005. The International Application was published in Japanese on Oct. 5, 2006 as International Publication No. WO 2006/103849 under PCT Article 21(2) the contents of which are incorporated herein in their entireties.

TECHNICAL FIELD

The invention relates to ball joints used in automobile suspension devices, steering devices, or the like.

BACKGROUND

Conventionally, as, for example, ball joints used in automobile suspension devices, steering devices, or the like, there has been known one including a socket in an approximately cylindrical shape with a bottom having an inner chamber provided with an opening portion and a bottom surface portion, a ball seat as being a bearing seat housed in the inner chamber of this socket and having an opening communicated with the opening portion, a cushion seat as being an elastic member interposed between this ball seat and the inner chamber of the socket, and a ball stud having a ball portion held so as to be slidable on a sliding surface in the ball seat and a stud portion inserted through the opening and the opening portion. And, for this ball joint, formed at an end portion on a side opposite to the opening of the bearing seat is a load receiving surface portion opposed to the bottom surface portion of the inner chamber of the socket, and when a compressive load in the axial direction equal to or greater than a predetermined value is applied to the ball stud, the load receiving surface portion of the bearing seat comes into contact with the bottom surface portion of the inner chamber of the housing, whereby the load is received by the bearing seat so as to prevent settling of the elastic member in the axial direction (see, for example, Japanese Examined Patent Publication No. 7-30781 (Pages 2-3, FIG. 1)).

SUMMARY OF THE INVENTION

However, in the above-described ball joint, when a large load equal to or greater than a predetermined value is applied to the ball stud, there is a possibility that the cushion seat is crushed in the central axis direction to be plastically deformed, that is, permanently deformed, and with such a permanent deformation, rattling of the ball seat may occur in the socket, wherein exists a problem.

The present invention has been made in view of such a problem, and an object thereof is to provide a ball joint for which rattling of the bearing seat in the socket is prevented.

A ball joint as set forth in the first aspect of the invention includes: a socket with an inner chamber having an opening portion at one end thereof and having a bottom surface portion at the other end thereof; a bearing seat with an opening at one end thereof and housed in the inner chamber of the socket so that this opening is communicated with the opening portion; a ball stud with a ball portion rotatably held by this bearing seat and housed in the inner chamber of the socket and a stud portion provided in a protruding manner from this ball portion and inserted through the opening and the opening portion; and a cylindrical elastic member interposed between the bearing seat and an inner surface of the socket and provided with an opposing surface portion on an inner circumferential side thereof, wherein the bearing seat is provided with: a first load receiving portion that is opposed to the opposing surface portion apart therefrom in a state housed in the socket and is not applied with a force from the outside and that comes into contact with the opposing surface portion when a predetermined-direction load equal to or greater than a first predetermined value is applied to the ball stud; and a second load receiving portion that is apart from the bottom surface portion in a state housed in the socket and is not applied with a force from the outside and that comes into contact with the bottom surface portion when a predetermined-direction load equal to or greater than a second predetermined value greater than the first predetermined value is applied to the ball stud.

And, when a predetermined-direction load equal to or greater than a first predetermined value acts on the ball stud, if the elastic member is deformed by a predetermined amount, the first load receiving portion of the bearing seat comes into contact with the opposing surface portion on the inner circumferential side of the elastic member, whereby a plastic deformation of this elastic member in the central axis direction is prevented, and when a predetermined-direction load equal to or greater than a second predetermined value acts on the ball stud, the second load receiving portion of the bearing seat comes into contact with the bottom surface portion of the inner chamber of the housing and a predetermined-direction load onto the elastic member is reduced, whereby a plastic deformation of the elastic member is prevented, and rattling of the bearing seat in the socket is prevented.

A ball joint as set forth in the second aspect of the invention is the ball joint as set forth in the first aspect of the invention, wherein the bearing seat is formed in an almost cylindrical shape, is provided with the first load receiving portion on an outer circumferential surface of the other end portion thereof, and is provided with the second load receiving portion in a plane shape at a front end portion thereof continuously to the first load receiving portion.

In addition, by providing the first load receiving portion on the outer circumferential surface of the other end portion of the approximately cylindrical shaped bearing seat, when a predetermined-direction load equal to or greater than the first predetermined value acts on the ball stud, the first load receiving portion reliably comes into contact with the opposing surface portion, so that a deformation in the central axis direction of the elastic member is more reliably prevented, and by providing the second load receiving portion in a plane shape at the front end portion of the bearing seat continuously to the first load receiving portion, when a predetermined-direction load equal to or greater than the second predetermined position acts on the ball stud, the second load receiving portion reliably comes into contact with the bottom surface portion and a predetermined-direction load onto the elastic member is reliably reduced, so that a plastic deformation of the elastic member is more reliably prevented.

According to the ball joint as set forth in the first aspect of the invention, when a predetermined-direction load equal to or greater than a first predetermined value acts on the ball stud, if the elastic member is deformed by a predetermined amount, the first load receiving portion of the bearing seat comes into contact with the opposing surface portion on the inner circumferential side of the elastic member, whereby a plastic deformation of this elastic member in the central axis direction can be prevented, and when a predetermined-direction load equal to or greater than a second predetermined value acts on the ball stud, the second load receiving portion of the bearing seat comes into contact with the bottom surface portion of the inner chamber of the housing and a predetermined-direction load onto the elastic member is reduced, whereby a plastic deformation of the elastic member can be prevented, and rattling of the bearing seat in the socket can be prevented.

According to the ball joint as set forth in the second aspect of the invention, in addition to the effect of the ball joint as set forth in the first aspect of the invention, by providing the first load receiving portion on the outer circumferential surface of the other end portion of the approximately cylindrical shaped bearing seat, when a predetermined-direction load equal to or greater than the first predetermined value acts on the ball stud, the first load receiving portion reliably comes into contact with the opposing surface portion, so that a deformation in the central axis direction of the elastic member can be more reliably prevented, and by providing the second load receiving portion in a plane shape at the front end portion of the bearing seat continuously to the first load receiving portion, when a predetermined-direction load equal to or greater than the second predetermined position acts on the ball stud, the second load receiving portion reliably comes into contact with the bottom surface portion and a predetermined-direction load onto the elastic member is more reliably reduced, so that a plastic deformation of the elastic member can be more reliably prevented.

DETAILED DESCRIPTION OF THE INVENTION

Hereinafter, a construction of a ball joint of an embodiment of the present invention will be described with reference to the drawings.

Figure 1:
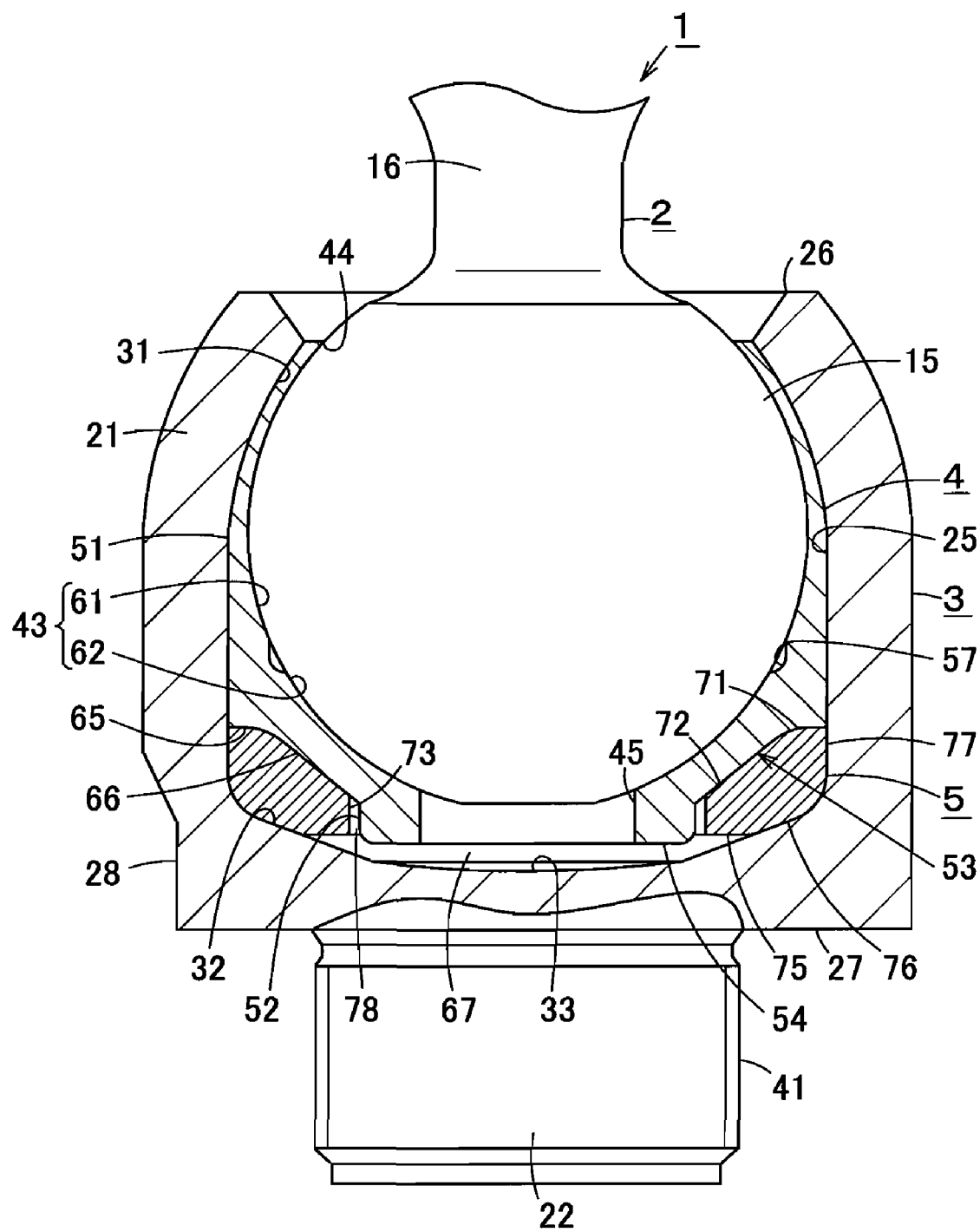
FIG. 1 is a longitudinal sectional view showing a ball joint of an embodiment of the present invention.

In FIG. 1, 1 denotes a ball joint, which is used in an automobile suspension device, steering device, or the like. And, this ball joint 1 includes a ball stud 2 made of steel or the like, a socket 3 in an approximately cylindrical shape with a bottom made of a metal or the like, a ball seat 4 made of a synthetic resin or the like as a bearing seat, a cushion seat 5 made of a synthetic resin or the like as being an elastic member, and an unillustrated dust cover or the like formed of rubber, a soft synthetic resin, or the like in an approximately cylindrical shape.

The ball stud 2 has a ball portion 15 held so as to be rotatable on the ball seat 4 and a stud portion 16 provided in a shaft form in a protruding manner from the ball portion 15.

The ball portion 15 is housed in the socket 3 in a state held on the ball seat 4. Moreover, the stud portion 16 is protruded from the socket 3.

Furthermore, the socket 3 has a socket body 21 in an approximately cylindrical shape with a bottom and a connecting portion 22 provided in a protruding manner from one axial end portion of the socket body 21 in the direction opposite to the stud portion 16 of the ball stud 2.

The socket body 21 is provided internally with an inner chamber 25 to which the ball seat 4 is fitted, is formed at one axial end portion thereof with an opening portion 26 communicated with the inner chamber 25, is formed at the other axial end portion thereof with a bottom portion 27 from which the connecting portion 22 is protruded, and is provided with a concave portion 28 at a predetermined position in an outer circumferential portion thereof. And, this socket body 21 holds the ball seat 4 in the inner chamber 25, and prevents the ball stud 2 from coming off from the socket 3 and ball seat 4, by fitting the ball seat 4 to the inner chamber 25 and deforming an outer marginal portion of the opening portion 26 by caulking in the central axis direction.

For the inner chamber 25, from the opening portion 26 side to the bottom portion 27 side, an inner circumferential surface portion 31, an inclined surface portion 32, and a bottom surface portion 33 are continuously and concentrically formed in order, and the inclined surface portion 32 and bottom surface portion 33 being on the bottom portion 27 side are reduced in diameter.

In addition, the inner circumferential surface portion 31 is formed in a cylindrical inner circumferential surface shape having an outside diameter dimension almost equal to the maximum outside diameter dimension of the ball seat 4.

Furthermore, the inclined surface portion 32 is formed in a cylindrical inner circumferential surface shape inclined, from the inner circumferential surface portion 31 to the bottom surface portion 33 side, toward the central axis.

Moreover, the bottom surface portion 33 is a part to be a bottom surface of the inner chamber 25, and is formed in a plane shape slightly inclined toward the central axis direction.

On the other hand, the connecting portion 22 is formed on the bottom portion 27 of the socket body 21 coaxially with this socket body 21, and is provided with a male screw portion 41 to be screwed into, for example, an unillustrated to-be-connected portion on the outer circumferential surface thereof.

Moreover, the ball seat 4 is formed of, for example, a synthetic resin such as polyacetal having flexibility in an approximately cylindrical shape, and is provided internally with a spherical surface-shaped sliding surface 43 that holds the ball portion 15 so as to be rotatable, and continuously from this sliding surface 43, is formed with an opening 44 at one axial end portion thereof, and is formed with a bottom opening 45 at the other axial end side thereof.

In addition, for the outer circumferential portion of this ball seat 4, an outer circumferential surface portion 51 held at the time of caulking deformation of the socket 3 by the inner circumferential surface portion 31 of this socket 3 is formed at the opening 44 side, at the other end side of this outer circumferential surface portion 51, a fitting concave portion 53 having a first load receiving portion 52 and being fitted with the cushion seat 5 is formed, and at the other end side of this fitting concave portion 53, a second load receiving portion 54 is formed in a plane shape to the central axis side.

The sliding surface 43 is a part that is deformed in a spherical surface shape along the ball portion 15 of the ball stud 2 by a caulking deformation of the socket 3, and holds the outer circumferential surface of the ball portion 15. Moreover, on this sliding surface 43, at a position on the other end side further than an equator position of the ball portion 15, that is, a position where the radius of the ball portion 15 is maximized on a plane orthogonal to the central axis of the ball stud 2, formed is an annular groove-shaped lubricant pool portion 57 that houses an unillustrated lubricant.

This lubricant pool portion 57 is provided almost parallel to the equator of the ball portion 15, that is, along the latitude-line direction of the ball portion 15. As a result, the sliding surface 43 is divided into an opening 44-side first sliding surface 61 and a bottom opening 45-side second sliding surface 62 by the lubricant pool portion 57.

In addition, the opening 44 is a part communicated with the opening portion 26 in a state where the ball seat 4 is fitted to the inner chamber 25 of the socket 3 and through which the stud portion 16 is inserted.

Furthermore, the bottom opening 45 is opposed to the bottom surface portion 33 of the inner chamber 25 of the socket 3, communicates the inside of the ball seat 4 with the inner chamber 25, and holds a lubricant between the bottom surface portion 33 and the outer circumferential surface of the ball portion 15 of the ball stud 2.

On the other hand, the outer circumferential surface portion 51 is formed in a circumferential surface shape having an outside diameter dimension almost equal to the inside diameter dimension of the inner circumferential surface portion 31, and is extended to the bottom opening 45 side further than the equator of the ball seat 4.

In addition, the fitting concave portion 53 has a first fitting surface portion 65 continuous to the outer circumferential surface portion 51, a second fitting surface portion 66 continuous to this first fitting surface portion 65, and a first load receiving portion 52 continuous to this second fitting surface portion 66 and the second load receiving portion 54.

Moreover, the first fitting surface portion 65 has an annular surface shape extended to the central axis side of the ball seat 4.

In addition, the second fitting surface portion 66 is formed in an annular surface shape inclined from the first fitting surface portion 65 to the other axial end side of the ball seat 4.

Furthermore, the first load receiving portion 52 is provided in a protruding manner from the second fitting surface portion 66 to the other axial end side of the ball seat 4, and is formed in a cylindrical outer circumferential surface shape. In addition, this first load receiving portion 52 is opposed to the inner circumferential side of the cushion seat 5 apart therefrom in a state where the cushion seat 5 and the ball seat 4 are fitted to the inner chamber 25 of the socket 3 and are not applied with a force from the outside.

Moreover, the second load receiving portion 54 is formed in an annular surface shape extended in a plane shape from the other end portion of the first load receiving portion 52 to the central axis direction, and is located at a marginal portion of the bottom opening 45. In addition, this second load receiving portion 54 is opposed to the bottom surface portion 33 of the inner chamber 25 apart therefrom in a state where the ball seat 4 and the cushion seat 5 are fitted to the inner chamber 25 of the socket 3 and are not applied with a force from the outside. That is, between the second load receiving portion 54 and the bottom surface portion 33, a space portion 67 is formed.

In addition, the cushion seat 5 is formed of a synthetic resin such as polyurethane, polyester, or rubber having elasticity in an approximately cylindrical shape and absorbs a dimensional tolerance between the ball seat 4 and the inner chamber 25 by an elastic force thereof, thereby preventing the ball seat 4 from rattling in the inner chamber 25 of the socket 3, and gives a preliminary load, that is, a preload, to the ball portion 15 of the ball stud 2 so as to stabilize operating torque of the ball stud 2.

Moreover, this cushion seat 5 has, at one axial end side thereof, a first contact surface portion 71 that comes into contact with the first fitting surface portion 65 in a state fitted to the inner chamber 25 of the socket 3 and fitted with the fitting concave portion 53 of the ball seat 4, is continuous in the central axis direction with a second contact surface portion 72 continuous to this first contact surface portion 71 and being in contact with the second fitting surface portion 66, and is formed at the inner circumferential side thereof with an opposing surface portion 73 continuous to this second contact surface portion 72 and opposed to the first load receiving portion 52 apart therefrom.

Furthermore, at the other axial end portion of the cushion seat 5, formed is a seat bottom surface portion 75 continuous to the opposing surface portion 73, and this seat bottom surface portion 75 is continuous at the outer circumferential side thereof with a seat inclined surface portion 76 that comes into contact with the inclined surface portion 32 in a state where the cushion seat 5 and the ball seat 4 are fitted to the inner chamber 25 of the socket 3 and the cushion seat 5 is fitted with the fitting concave portion 53 of the ball seat 4.

Moreover, this seat inclined surface portion 76 is continuous with a seat outer circumferential surface portion 77 that comes into contact with the inner circumferential surface portion 31 in a state where the cushion seat 5 and the ball seat 4 are fitted to the inner chamber 25 of the socket 3 and the cushion seat 5 is fitted with the fitting concave portion 53 of the ball seat 4, and one end portion of this seat outer circumferential surface portion 77 is continuous to the first contact surface portion 71.

The first contact surface portion 71 has an annular surface shape extended to the central axis side of the cushion seat 5.

In addition, the second contact surface portion 72 is formed in an annular surface shape inclined from the first contact surface portion 71 to the other axial end side of the cushion seat 5.

Moreover, the opposing surface portion 73 serves as an inner circumferential surface of the cushion seat 5, and is formed in a cylindrical inner circumferential surface shape continuous from the second contact surface portion 72 to the other axial end side of the cushion seat 5. In addition, this opposing surface portion 73 is opposed to the first load receiving portion 52 apart therefrom in a state where the ball seat 4 and cushion seat 5 are fitted to the inner chamber 25 of the socket 3 and are not applied with a force from the outside. That is, between the opposing surface portion 73 and the first load receiving portion 52, an annular-shaped gap 78 is formed across the entire circumference.

In addition, the seat bottom surface portion 75 is formed in an annular surface shape extended to the central axis side of the cushion seat 5, and serves as the other axial end surface of the cushion seat 5.

Furthermore, the seat inclined surface portion 76 is formed in an annular surface shape inclined in the axial direction of the cushion seat 5 with respect to the seat bottom surface portion 75.

Moreover, the seat outer circumferential surface portion 77 serves as an outer circumferential surface of the cushion seat 5, and is formed in a cylindrical outer circumferential surface shape.

Next, operations of the above-mentioned embodiment will be described.

When the ball joint 1 is assembled, the cushion seat 5 and the ball seat 4 are fitted to the inner chamber 25 in order through the opening portion 26 of the socket 3, the ball portion 15 of the ball stud 2 is inserted into the ball seat 4 and the stud portion 16 is protruded from the opening 44 and the opening portion 26, and an outer circumferential portion of the opening portion 26 of the socket 3 is deformed by caulking in the central axis direction, whereby the ball stud 2, the ball seat 4, and the cushion seat 5 are prevented from coming off from the socket 3.

In this state, the cushion seat 5 is fitted with the fitting concave portion 53 of the ball seat 4, so that the gap 78 is formed between the first load receiving portion 52 and the opposing surface portion 73, and the space portion 67 is formed between the second load receiving portion 54 and the bottom surface portion 33. Moreover, when no force is applied from the outside, the gap 78 and the elastic force of the cushion seat 5 absorb distortion and the like due to fitting of the ball seat 4 with the cushion seat 5, whereby an almost uniform force can be transmitted to the sliding surface 43, outer circumferential surface portion 51, and the like of the ball seat 4, a dimensional tolerance in the surface shapes of the ball portion 15 of the ball stud 2 that slides on the sliding surface 43 and the inner chamber 25 of the socket 3 can be absorbed, and friction torque due to sliding of the ball portion 15 can be stabilized.

Figure 2:
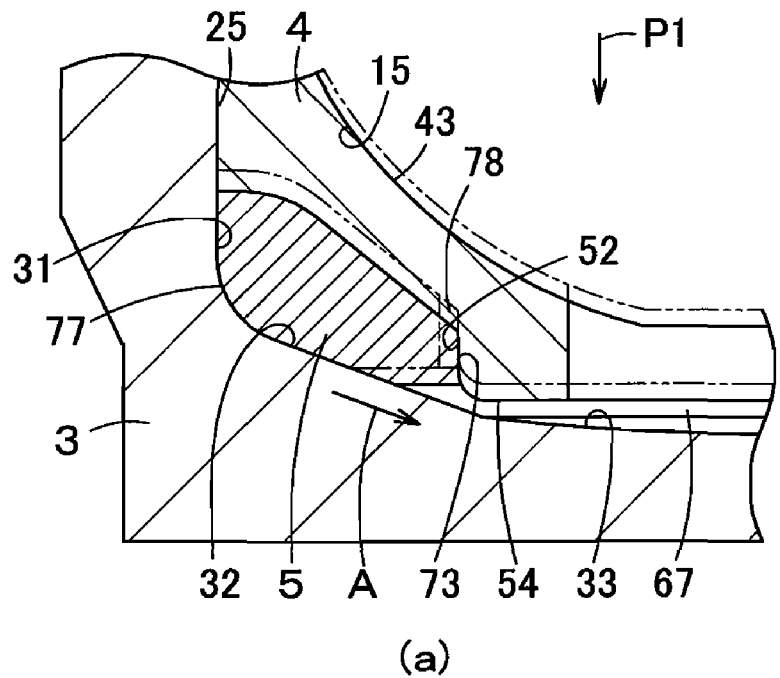
FIG. 2(a) is a longitudinal sectional view showing, in an enlarged manner, a part of the same ball joint as the above applied with a predetermined-direction load equal to or greater than a first predetermined value.
FIG. 2(b) is a longitudinal sectional view showing, in an enlarged manner, a part of the same ball joint as the above applied with a predetermined-direction load equal to or greater than a second predetermined value.
Figure 2:
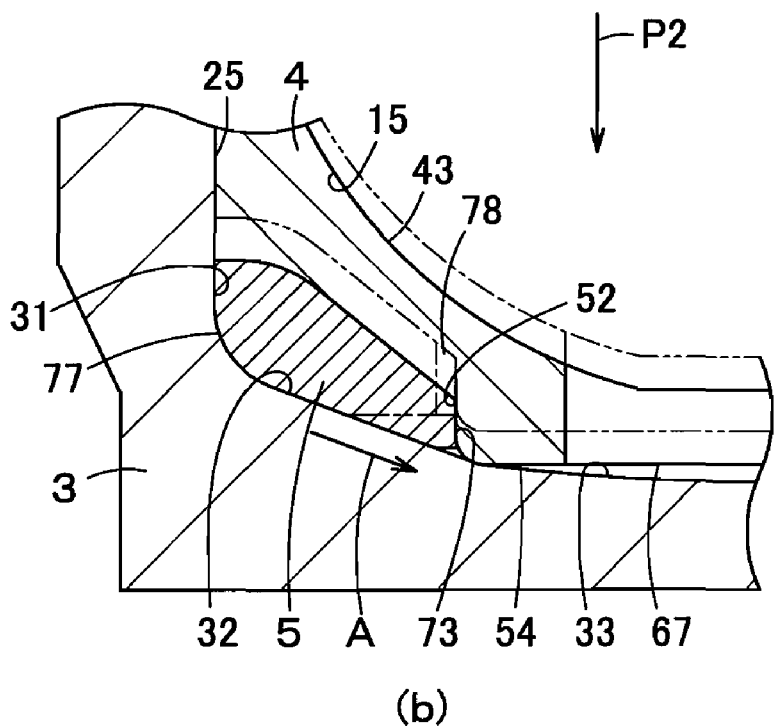

Moreover, when a predetermined-direction load equal to or greater than a first predetermined value, that is, an axial load P1 along the axial direction of the socket 3, is applied to the ball stud 2, as shown in FIG. 2(a), the ball seat 4 is flexibly deformed in the axial direction to the bottom surface portion 33 side of the socket 3, whereby the fitting concave portion 53 is deformed, so that the cushion seat 5 fitted with this fitting concave portion 53 is flexibly deformed by a predetermined amount in the axial direction and the central axis direction. That is, the cushion seat 5 is flexibly deformed into a direction shown by an arrow A along the inclination direction of the inclined surface portion 32.

At this time, the gap 78 is narrowed and the entire surface of the opposing surface portion 73 comes into contact with the entire surface of the first load receiving portion 52 of the ball seat 4, whereby the ball seat 4 prevents the cushion seat 5 from being deformed by a predetermined amount or more in the central axis direction.

Furthermore, when an axial load P2 equal to or greater than a second predetermined value greater than the first predetermined value is applied to the ball stud 2, as shown in FIG. 2(b), the ball seat 4 and the cushion seat 5 are further flexibly deformed in the arrow A direction.

At this time, the gap 78 is narrowed and the entire surface of the opposing surface portion 73 comes into contact with the entire surface of the first load receiving portion 52 of the ball seat 4, and the space portion 67 is narrowed and the second load receiving portion 54 of the ball seat 4 comes into contact with the bottom surface portion 33 of the inner chamber 25 of the socket 3, whereby an axial load onto the cushion seat 5 is reduced, and the ball seat 4 prevents the cushion seat 5 from being deformed by a predetermined amount or more in the central axis direction.

As a result, even when a relatively large axial load is applied to the ball stud 2, since a plastic deformation, that is, a permanent deformation, of the cushion seat 5 can be suppressed in the central axis direction and the axial direction, the elastic force of the cushion seat 5 to press the ball seat 4 against the inner chamber 25 is hardly lost, so that rattling of the ball seat 4 in the socket 3 can be prevented over a higher load than that of the conventional art.

In addition, by providing the first load receiving portion 52 on the outer circumferential surface of the other end portion of the approximately cylindrical shaped ball seat 4, when the axial load P1 equal to or greater than the first predetermined value acts on the ball stud 2, the first load receiving portion 52 reliably comes into contact with the opposing surface portion 73, so that a deformation in the central axis direction of the cushion seat 5 can be more reliably prevented, and by providing the second load receiving portion 54 in a plane shape at a front end portion of the ball seat 4 continuously to the first load receiving portion 52, when the axial load P2 equal to or greater than the second predetermined value acts on the ball stud 2, the second load receiving portion 54 reliably comes into contact with the bottom surface portion 33 and an axial load onto the cushion seat 5 can be more reliably reduced, so that a permanent deformation of the cushion seat 5 can be more reliably suppressed.

Moreover, as a result of load resistance to an axial load thus being improved, the above-described ball joint 1 can be applied to a part where the load is large, and thus usability can be improved.

However, in the above-mentioned embodiment, the shape of the inner circumferential surface side that serves as a sliding surface of the ball seat 4 can be arbitrarily set such as, for example, to further provide therein a groove portion that holds a lubricant.

The present invention can be applied to, for example, an automobile suspension device, steering device, or the like.

The invention claimed is:

1. A ball joint comprising:
   a socket with an inner chamber having an opening portion at one end thereof and having a bottom surface portion at the other end thereof;
   a bearing seat with an opening at one end thereof and housed in the inner chamber of said socket so that the opening is communicated with said opening portion;
   a ball stud with a ball portion rotatably held by the bearing seat and housed in the inner chamber of said socket and a stud portion provided in a protruding manner from the ball portion and inserted through said opening and said opening portion; and
   a cylindrical elastic member interposed between said bearing seat and an inner surface of said socket, the cylindrical elastic member being positioned apart from the bottom surface portion in a state where no load has been applied in an axial direction to the ball stud by an outside force and being provided with an opposing surface portion on an inner circumferential side thereof, wherein
   said bearing seat comprises:
   a first load receiving portion that has a cylindrical outer surface extending toward the bottom surface in a direction parallel to the axial direction, the first load receiving portion being configured opposite and apart from said opposing surface portion to define a gap between the first load receiving portion and said opposing surface portion when no load has been applied to the ball stud by an outside force in the axial direction, and being configured to come into contact with said opposing surface portion when an external force equal to or greater than a first predetermined value is applied to said ball stud in the axial direction, thereby preventing the cylindrical elastic member from being deformed toward the central axis by more than a predetermined amount; and
   a second load receiving portion that is configured below the cylindrical elastic member and spaced apart from said bottom surface portion when no load has been applied to the ball stud by an outside force in the axial direction, such that a space between the second load receiving portion and said bottom surface portion is greater than the gap between the first load receiving portion and said opposing surface portion, and that is configured to come into contact with said bottom surface portion when an external force equal to or greater than a second predetermined value greater than said first predetermined value is applied to said ball stud in the axial direction, thereby preventing the cylindrical elastic member from being deformed toward the central axis by more than the predetermined amount in cooperation with the first load receiving portion.

2. The ball joint as set forth in claim 1, wherein the first load receiving portion is on an outer circumferential surface of an end portion of the bearing seat located at the bottom surface portion side of the socket, and the second load receiving portion, is at the end portion of the bearing seat, in a plane shape.

* * * * *